United States Patent [19]

Jackson

[11] 4,134,604
[45] Jan. 16, 1979

[54] VEHICLE SUSPENSION

[75] Inventor: William E. Jackson, Omaha, Nebr.

[73] Assignee: Jackson Lift Co., Inc., Arlington, Nebr.

[21] Appl. No.: 813,474

[22] Filed: Jul. 7, 1977

[51] Int. Cl.² ............................................. B60G 11/46
[52] U.S. Cl. ...................................... 280/704; 267/41
[58] Field of Search ............... 280/698, 699, 704, 680, 280/697, 715, 718; 267/54 C, 41

[56] References Cited

U.S. PATENT DOCUMENTS

| 3,860,256 | 1/1975 | Jackson | 280/81 R |
|---|---|---|---|
| 4,007,801 | 2/1977 | Vincent | 280/704 |
| 4,046,402 | 9/1977 | Allison | 280/674 |
| 4,065,153 | 12/1977 | Pringle | 280/704 |

Primary Examiner—Joseph F. Peters, Jr.
Assistant Examiner—John A. Carroll
Attorney, Agent, or Firm—Schmidt, Johnson, Hovey & Williams

[57] ABSTRACT

A retractable tag axle assembly, including a hydraulic cylinder for up-and-down reciprocation of the tandem axle, is provided with structure for protecting the cylinder against damage from shock forces imparted to the suspension spring through the ground-engaging wheels. The structure includes a crank secured to one end of the spring and coupled with the hydraulic cylinder at a point intermediate the ends of the spring such that the full length of the latter is available for up-and-down flexure, yet the overall length of the assembly, is not increased over that of conventional tag axle assemblies. Ball-and-socket type mountings between the ends of the cylinder, and the frame and crank respectively, permit canting of the cylinder to avoid the adverse effects of twisting of the crank relative to the frame.

9 Claims, 6 Drawing Figures

VEHICLE SUSPENSION

This invention relates generally to tandem axle assemblies for overland vehicles and particularly concerns tag or pusher-type auxiliary axles which may be selectively raised or lowered in response to load conditions on the vehicle.

Lift-type auxiliary axles are known in the art as evidenced for example, by our prior U.S. Pat. No. 3,860,256. Such axle assemblies typically comprise a spring member pivotally secured to the vehicle frame, a wheel-carrying axle secured to the spring for movement therewith, and lift means disposed between the frame and the spring for effecting powered up-and-down swinging movement of the spring. Thus, the vehicle operator can vary the load carried by the auxiliary axle and may fully retract the axle to raise the wheels from the ground under no load conditions such that tire wear may be significantly reduced.

A problem with tag axle assemblies heretofore available is that the lift means is subjected to extremely high shock forces which are transmitted thereto when the vehicle is operated over rough roadways. Such shock forces may be damaging to the lift means particularly when such means includes hydraulic cylinders; consequently, many of the benefits of tag axle assemblies are offset by high maintenance and repair expenses for the lift means utilized to raise and lower the auxiliary axle.

The above-described problem is compounded by side-thrust forces which are developed when the vehicle is operated along a nonlinear path of travel. For example, while the vehicle is turning a corner, scruffing experienced between the tires and the roadway results in a side-thrust which is transmitted to the lift means through the suspension spring. In the case of hydraulic cylinders, these side thrusts produce high strain on the cylinder seals often resulting in premature failure of the cylinders.

Yet another problem encountered with the use of tag axle assemblies is that of an inadequate amount of "walk" between the axle and the vehicle frame. In this connection, it is to be appreciated that the tag axle assemblies are normally non-driven but are mounted in close proximity to one or more driven axles of the vehicle. Thus, when the vehicle is maneuvered over a discontinuous substrate, such as when backing over a curb, it is necessary that the non-driven axle be capable of flexing or "walking" a sufficient degree to insure that the wheels on the driven axle at all times remain in contact with the substrate. Otherwise, of course, the full weight of the vehicle would be transferred to the tag axle assembly thereby suspending the driven wheels from the substrate and rendering the vehicle immobile.

Accordingly, it is an important object of the present invention to reduce the incidence of power means failure in a tag axle assembly by protecting the power means against damage from shock forces encountered by the ground-engaging wheels.

It is a further important object of the present invention to reduce power means failure in a tag axle assembly by isolating the power means from side-thrust forces imparted to the wheels.

Yet another important object of our invention is to increase the range of up-and-down deflection in a tag axle assembly without appreciably increasing the overall length of the assembly.

Figure 1:
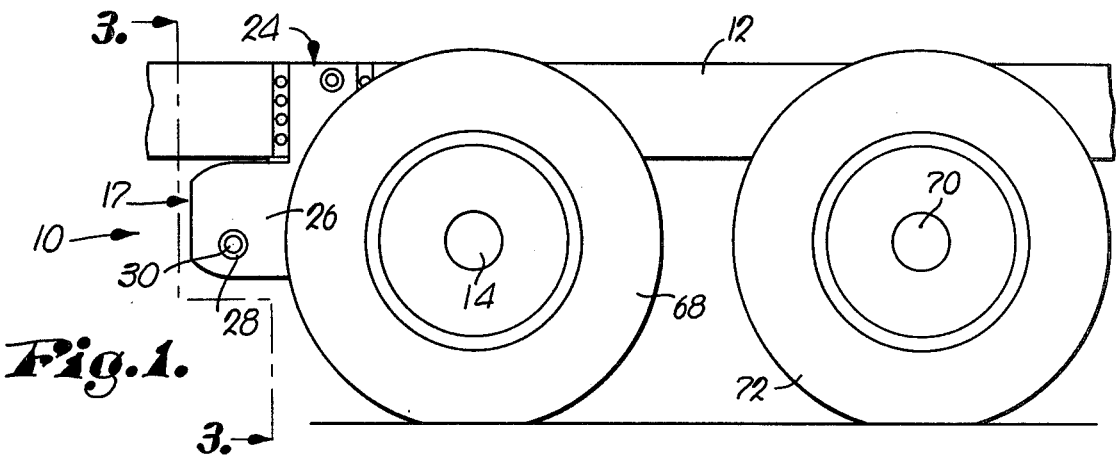
FIG. 1 is a side elevational view of a vehicle suspension constructed in accordance with the principles of the present invention and shown positioned upon the frame of an overland vehicle.
Figure 2:
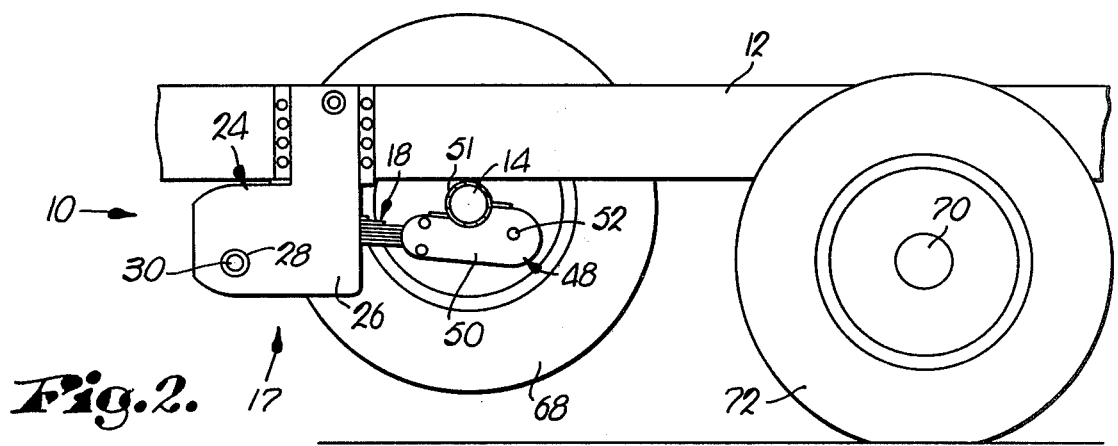
FIG. 2 is a side elevational view showing the axle in its raised position and having parts broken away for clarity.
Figure 6:
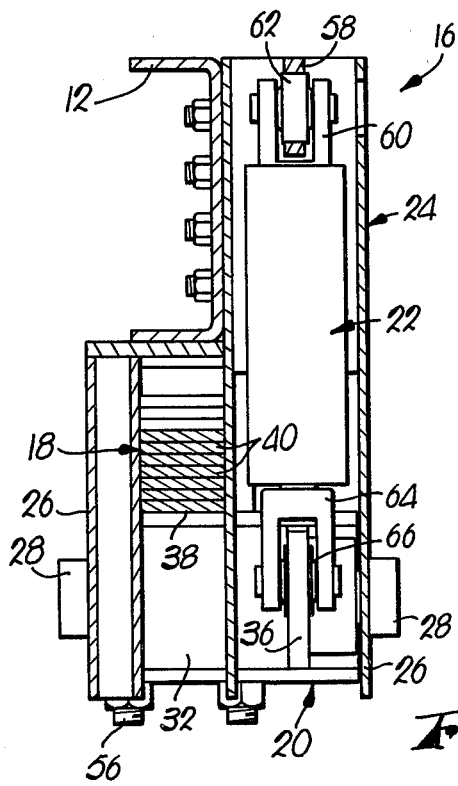
FIG. 6 is an enlarged, cross-sectional view taken along line 6—6 of FIG. 5.
Figure 3:
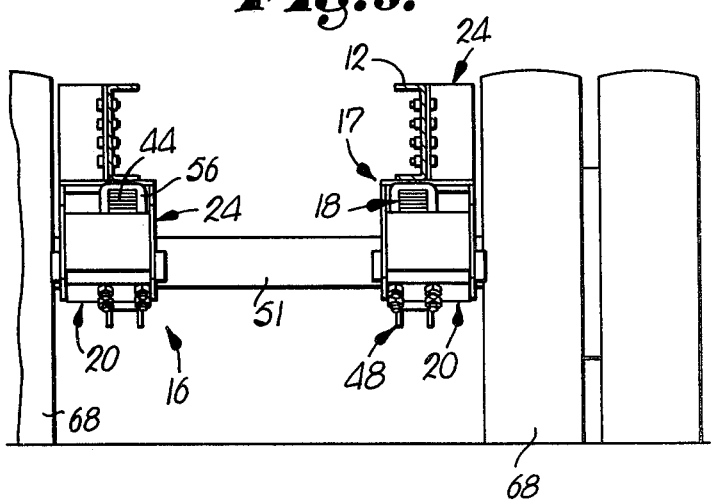
FIG. 3 is a fragmentary, cross-sectional view taken along line 3—3 of FIG. 1.
Figure 4:
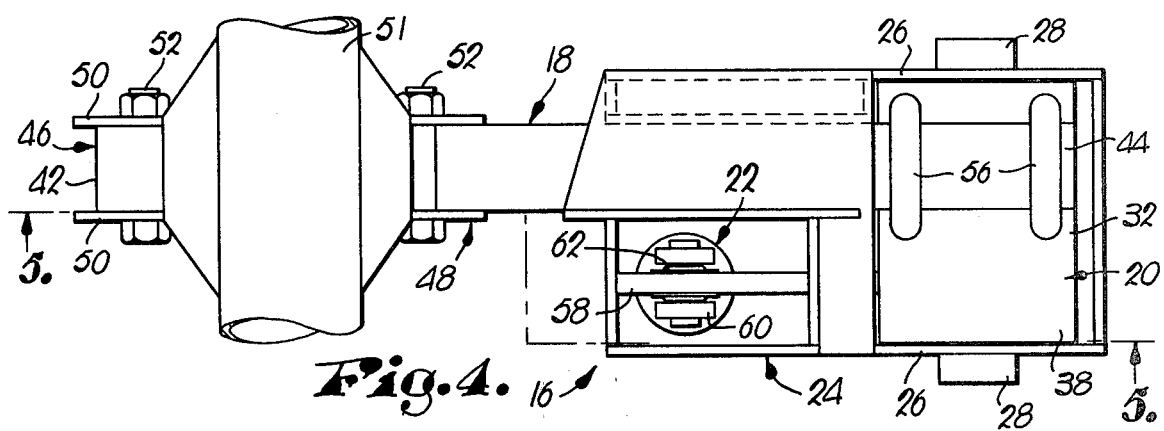
FIG. 4 is a fragmentary, enlarged plan view.

Throughout the drawings there is shown a lift-type wheel and axle assembly 10 mounted on the frame 12 of a conventional over-the-road vehicle. The assembly 10 includes an elongate wheel-carrying axle 14 and a pair of support assemblies 16, 17 mounting the axle 14 transversely of the frame 12 for up-and-down reciprocation relative to the latter.

The support assemblies 16, 17 are disposed on opposite sides of the frame 12 and are virtual mirror images of one another. Inasmuch as the assemblies 16, 17 are otherwise identical, only the assembly 16 will be described hereinbelow, it being understood that the assembly 17 is provided with the same component parts.

Figure 5:
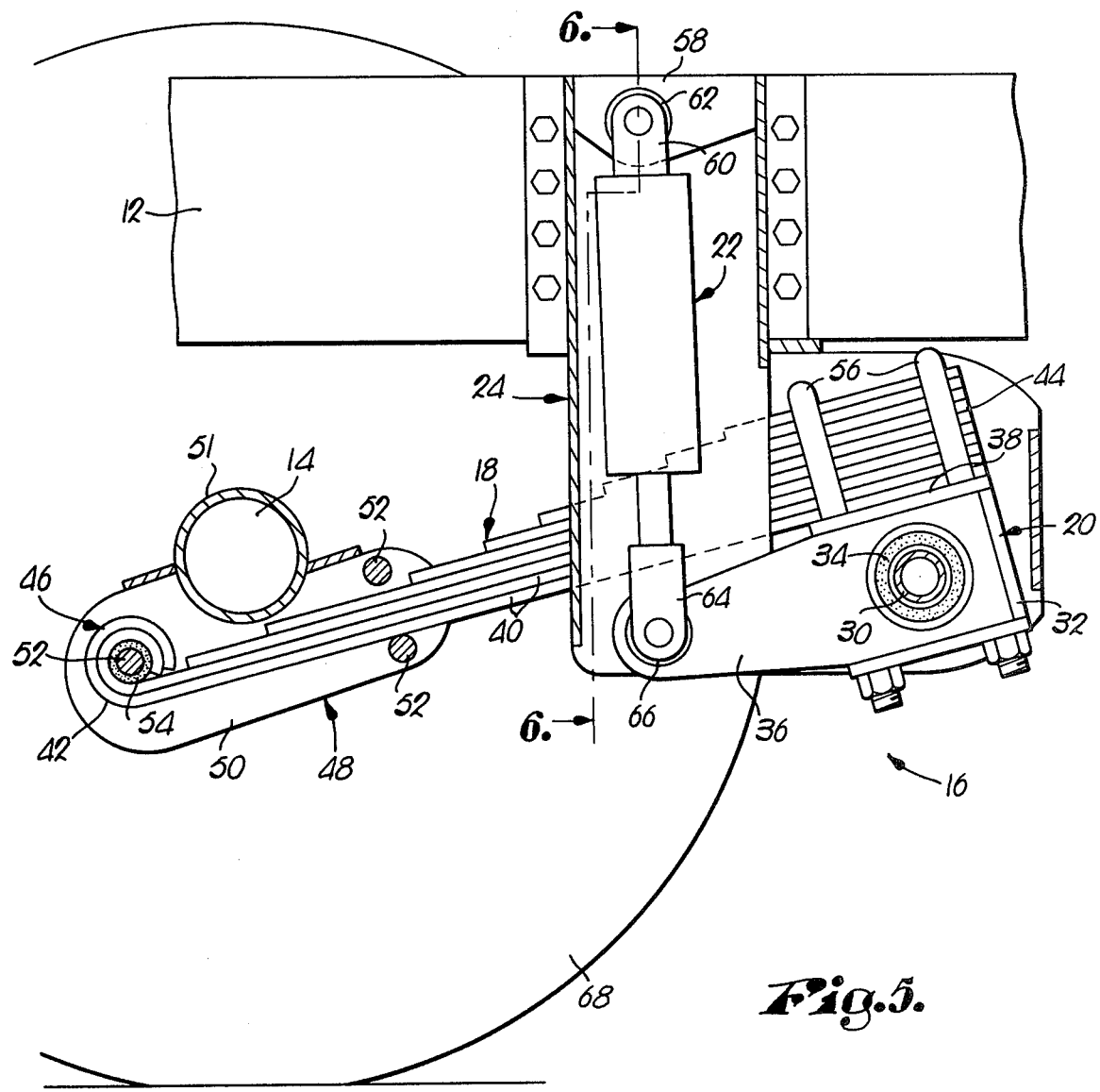
FIG. 5 is a fragmentary, enlarged, cross-sectional view taken along line 5—5 of FIG. 4.

As shown in FIG. 5, the assembly 16 includes a springy beam in the nature of an elongate flat spring 18, structure 20 mounting the spring 18 for up-and-down movement relative to the frame 12. and power means in the form of a hydraulic cylinder 22 extending between the frame 12 and the structure 20 for powered swinging of the spring 18.

A depending hanger bracket 24 is rigidly secured to the frame 12 and provides a convenient support for the structure 20. The bracket 24 has a pair of upright, laterally spaced walls 26, each having an outwardly extending, cylindrical, tubular reinforcing boss 28.

The structure 20 includes an elongate pivot 30 received within the bosses 28 in the walls 26 and spanning the distance therebetween. A short box beam 32 is mounted on the pivot 30 by a resilient bushing 34 rotation about its longitudinal axis. The beam 32 has an elongate crank 36 extending therefrom perpendicularly to its longitudinal axis which provides mechanical advantage for rotation of the beam about the pivot 30. The box beam 32 has a normally upwardly facing flat surface 38 for engaging the spring 18 in a manner to be described.

The spring 18 is of the leaf type, having a plurality of elongate leaves 40 of various lengths. As shown in FIG. 5, the leaves 40 are stacked one on top of the other in order of decreasing length with the shortest leaf 40 being disposed at the top of the stack. The spring 18 has a pair of ends 42 and 44 respectively, the leaves 40 being arranged such that each has one end disposed at end 44 of the spring 18 in coplanar relationship to the ends of the other leaves 40. The two lowermost leaves 40 have upturned ends at end 42 of the spring 18 to present a tubular mount 46.

The axle 14 is attached to the spring 18 adjacent end 42 by a mounting assembly 48. The assembly 48 includes a pair of baseplates 50 configured to present a cradle for a tubular axle collar 51 extending transversely of the frame 12 and captively mounted on the spring 18 by three pins 52 extending between the plates 50. One of the pins 52 is disposed within the tubular mount 46, there being a resilient tubular member 54 disposed between the pin 52 and the mount 46 such that there is formed a flexible securement between the spring 18 and the axle 14. The remaining two pins 52 are spaced from the pin 52 associated with the mount 46 in offset relationship above and below the spring 18. Axle 14 is coaxially received within the collar 51.

A pair of U-bolts 56 straddle the spring 18 adjacent end 44 and project through the beam 32 to mount the end 44 of spring 18 securely on the surface 38 of the beam 32. By virtue of this arrangement the spring 18 is disposed for swinging movement with the beam 32, yet is capable of being deflected along substantially its entire length.

The bracket 24 has an upper cross member 58 for supporting the cylinder end 60 of cylinder 22, there being a ball-and-socket type coupling 62 shiftably mounting the end 60 on the member 58. The rod end 64 of cylinder 22 is attached to the crank 36 at a point remote from pivot 30 by a second ball-and-socket coupling 66. Hence, extension and retraction of the cylinder 22 effects powered rotation of the beam 32 and consequent swinging of the spring 18, which movement is given mechanical advantage by virtue of the crank 36.

Typically, the axle 14 is provided with a number of ground-engaging wheels 68 and the assembly 10 is mounted on the frame 12 adjacent a driven axle 70 which supports two or more ground-engaging wheels 72.

In operation, the operator of the vehicle adjusts the extension of the cylinder 22 until the load carried by axle 14 is substantially equal to the load carried by axle 70. With the assembly 10 so disposed, the operator can carry a maximum pay load without exceeding the weight limit requirements imposed by the various states. By virtue of the fact that the cylinder is infinitely adjustable along its stroke, the weight of any pay load may be quickly and easily distributed between the axis 14 and 70.

As the loaded vehicle is driven along the roadway, shock forces imparted to the wheels 68 and transmitted to the axle 14 are greatly dissipated by the mounting assembly 48, flexure in spring 18, and the resilient bushing 34 such that the resulting shock forces on the cylinder 22 are greatly reduced. Similarly, side thrust encountered by the wheels 68 and transmitted to axle 14 is greatly dissipated before it reaches the cylinder 22. Moreover, in this regard, any twisting movement in the assembly 10 caused by side thrust is not transmitted to the cylinder 22. Rather, the couplings 62, 66 simply shift in response to the twisting movement, thereby preventings undesired twisting of the cylinder 22. Thus, the couplings 62, 66, the resilient member 54, and structure 20, including resilient bushing 34, collectively comprise a mechanism for protecting the cylinder 22 against damage from shock forces and side thrust encountered by the wheels 68.

Should the operator be required to back the vehicle over a large ground obstruction, such as a curb, flexure in the full length of the spring 18 assures that the wheels 72 will remain in continuous contact with the ground such that the vehicle is not immobilized. Of course, when the operator determines that the load in his vehicle is such that it may be supported by only the axle 70, he simply retracts the hydraulic cylinder 22, thereby raising the wheels 68 from the ground. During operation of the vehicle with the wheels so disposed, tire wear on the wheels 68 is greatly reduced to the ultimate effect that the operator is provided with savings in operation costs.

From the foregoing, it will be appreciated that the present invention accomplishes all of the stated objects without employing expensive and complicated structure which would tend to offset the benefits of the device. The cylinder 22 is effectively isolated from shock forces transmitted through the ground-engaging wheels 68 by virtue of the unique mounting arrangement between the spring 18 and the cylinder 22. Further, the resilient mountings and the ball-and-socket couplings 62, 66 protect the cylinder 22 against damage from side thrust.

The mounting arrangement between the spring 18 and the cylinder 22 also permits flexure along substantially the full length of the spring 18. Hence, the degree of "walk" permitted in the present invention is improved over known prior art devices.

Having thus described the invention, what is claimed as new and desired to be secured by Letters Patent is:

1. In a lift-type, auxiliary wheel and axle assembly for a vehicle provided with a frame:

an elongate, springy beam having one end thereof secured to the axle of said assembly;

power means carried by said frame for raising and lowering said axle; and mechanism for protecting the power means against damage, said mechanism including structure for isolating the power means from shock forces imparted to the beam through the wheels of said assembly during over-the-road travel, said structure including:

a crank having a mount swingably securing the crank to the frame, means attaching the power means to the crank for swinging the latter; and means joining the opposite end of the beam to the crank for swinging movement therewith, said attaching means being in an upright plane disposed intermediate the mount and said axle.

2. The invention of claim 1, said structure including a yieldable member for said mount disposed between said crank and said frame.

3. The invention of claim 1, said structure including a resilient bushing for said mount disposed between said crank and said frame.

4. The invention of claim 1, said mechanism including a flexible securement between said one end of the spring beam and said axle.

5. The invention of claim 1, said beam being cantilevered from said joining means when said axle is raised to its uppermost position by said power means.

6. The invention of claim 1, said mechanism including a ball-and-socket-type coupling forming a part of said attaching means.

7. The invention of claim 1, said power means comprising a fluid-actuated piston and cylinder mechanism.

8. The invention of claim 1, said beam being a leaf spring and having a plurality of leaves of graduated length, the ends of said leaves at said opposite end of the spring being coplanar.

9. The invention of claim 1, there being a ball-socket connection between the frame and the power means for further protection of the latter.

* * * * *

UNITED STATES PATENT AND TRADEMARK OFFICE
CERTIFICATE OF CORRECTION

PATENT NO. : 4,134,604
DATED : Jan. 16, 1979
INVENTOR(S) : William E. Jackson et al.

It is certified that error appears in the above-identified patent and that said Letters Patent are hereby corrected as shown below:

In the heading reference [75] should read as follows:

-- Inventors: William E. Jackson, Omaha, Nebr.
James M. Becker, Arlington, Nebr. --

Signed and Sealed this

Twenty-fourth Day of April 1979

[SEAL]

Attest:

RUTH C. MASON
Attesting Officer

DONALD W. BANNER
Commissioner of Patents and Trademarks